United States Patent
Kim

(10) Patent No.: US 8,743,230 B2
(45) Date of Patent: Jun. 3, 2014

(54) DIGITAL PHOTOGRAPHING APPARATUS, METHOD FOR CONTROLLING THE SAME, AND RECORDING MEDIUM STORING PROGRAM TO EXECUTE THE METHOD

(75) Inventor: Seung-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 13/017,356

(22) Filed: Jan. 31, 2011

(65) Prior Publication Data

US 2011/0187885 A1 Aug. 4, 2011

(30) Foreign Application Priority Data

Feb. 2, 2010 (KR) .................. 10-2010-0009664

(51) Int. Cl.
*H04N 5/228* (2006.01)

(52) U.S. Cl.
USPC ........................................ 348/222.1

(58) Field of Classification Search
None
See application file for complete search history.

(56) References Cited

U.S. PATENT DOCUMENTS

| | | | |
|---|---|---|---|
| 5,873,007 A * | 2/1999 | Ferrada Suarez | 396/296 |
| 6,806,906 B1 * | 10/2004 | Soga et al. | 348/333.03 |
| 7,007,011 B1 * | 2/2006 | Joshi | 1/1 |
| 8,428,329 B2 * | 4/2013 | Miyamoto | 382/132 |
| 2003/0206240 A1 | 11/2003 | Hyodo et al. | |
| 2006/0098112 A1 * | 5/2006 | Kelly | 348/333.12 |
| 2008/0063304 A1 * | 3/2008 | Russak et al. | 382/298 |
| 2009/0154804 A1 * | 6/2009 | Nacman et al. | 382/167 |

FOREIGN PATENT DOCUMENTS

| JP | 2000-270242 A | 9/2000 |
|---|---|---|
| JP | 2007-251993 A | 9/2007 |

\* cited by examiner

*Primary Examiner* — Luong T Nguyen
(74) *Attorney, Agent, or Firm* — Drinker Biddle & Reath LLP

(57) ABSTRACT

Provided are a digital photographing apparatus, a method of controlling the same, and a recording medium storing a program to execute the method. The digital photographing apparatus includes a photographing unit, an image analyzing unit, and a composing providing unit. The photographing unit generates an image signal by capturing an image of a subject. The image analyzing unit detects an edge component of the image from the image signal. The composition providing unit provides an image composition by using the detected edge component.

19 Claims, 12 Drawing Sheets

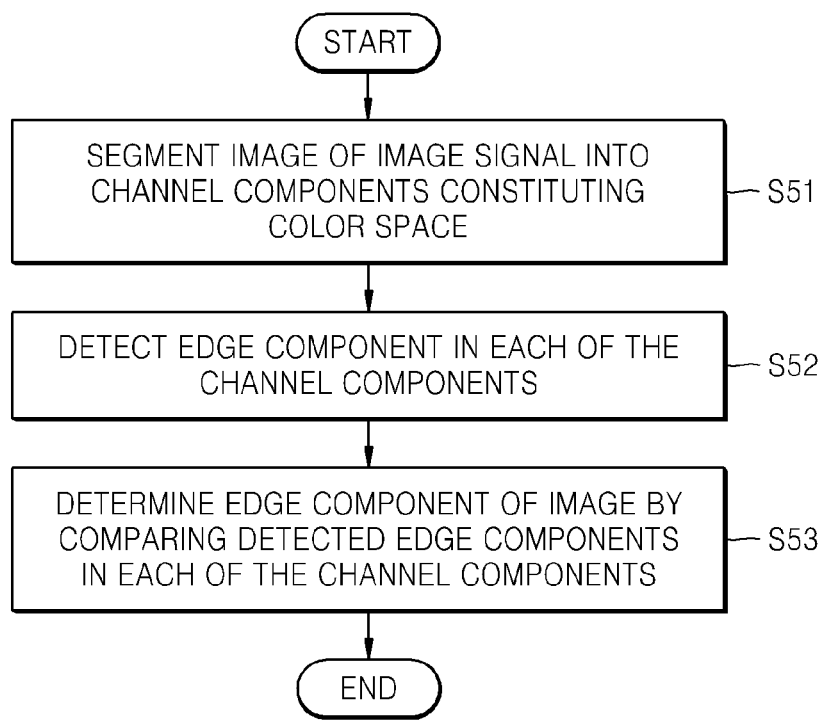

DIGITAL PHOTOGRAPHING APPARATUS, METHOD FOR CONTROLLING THE SAME, AND RECORDING MEDIUM STORING PROGRAM TO EXECUTE THE METHOD

CROSS-REFERENCE TO RELATED PATENT APPLICATION

This application claims the benefit of Korean Patent Application No. 10-2010-0009664, filed on Feb. 2, 2010, in the Korean Intellectual Property Office, the entire disclosure of which is incorporated herein by reference.

BACKGROUND

1. Field of the Invention

An aspect of the invention relates to a digital photographing apparatus, a method of controlling the same, and a recording medium storing a program to execute the method.

2. Description of the Related Art

When subjects are photographed by digital photographing apparatuses, such as digital cameras and camcorders, the characteristics of captured images are determined by factors such as focusing, exposure, and white balance. For example, the resolution of images may be determined by the focusing, and the brightness of images may be determined by the exposure.

In addition to the above factors, image composition is an important factor that affects the feeling the viewer gets from viewing the image. Composition refers to the placement of subjects in a captured image. A photographer may express various feelings by using an appropriate composition. Even if other photographing factors are appropriately selected, without an appropriate composition, an image may not satisfy the photographer.

SUMMARY

Therefore there is a need in the art for a digital photographing apparatus including: a photographing unit for generating an image signal by capturing an image of a subject; an image analyzing unit for detecting an edge component of the image from the image signal; and a composition providing unit for providing an image composition using the detected edge component.

The composition providing unit may be configured to provide an image composition guide according to the detected edge component.

The composition providing unit may further be configured to display the detected edge component in a first color when the edge component is composed in relation to the provided image composition guide and to display the detected edge component in a second color when the edge component is not composed in relation to the provided image composition guide.

The provided image composition may include guiding lines for illustrating where a detected edge component should be placed in the image.

The composition providing unit may further configured to display the detected edge component in a first color when it is between the guiding lines and to display the detected edge component in a second color when it is not between the guiding lines.

The image analyzing unit may detect the edge component of the image by using a Hough transform.

The image analyzer may detect a linear component from the edge component of the image by using the Hough transform.

The image analyzer may extract a predetermined number of linear components having high priorities from the linear components detected by the Hough transform and assigned with priorities.

The composition providing unit may provide the image composition according to slopes, lengths, or mutual positions of the extracted linear components.

The image analyzer may detect a parabolic component from the edge component of the image by using the Hough transform.

The digital photographing apparatus may further include an image downsizing unit for downsizing a size of the image. Here, the image analyzer unit may detect an edge component by using an image signal of the downsized image.

The image analyzer may include: a channel segmentation unit for segmenting an image of the image signal into a plurality of channels constituting a color space; and an edge component detecting unit for detecting edge components from respective images including the segmented channels.

The image analyzer may detect the edge components of the image by comparing results of the detecting of the edge components from the respective images including the segmented channels.

According to another aspect of the invention, there is provided a method of controlling a digital photographing apparatus, including: generating an image signal by capturing an image of a subject; detecting an edge component of the image from the image signal; and providing an image composition using the detected edge component.

The detecting of the edge component may include detecting the edge component of the image by using a Hough transform.

The detecting of the edge component may include detecting a linear component from the edge component of the image using the Hough transform.

The detecting of the linear component may include detecting the linear components, assigning priorities to the detected linear components, and extracting a predetermined number of linear components having high priorities from the linear components assigned with the priorities.

The providing of the image composition may include providing the image composition according to slopes, lengths, or mutual positions of the extracted linear components.

The detecting of the edge component may include detecting a parabolic component from the edge component of the image by using the Hough transform.

The method may further include downsizing a size of the image. Here, the detecting of the edge component may include detecting an edge component by using an image signal of the downsized image.

The detecting of the edge component may include: segmenting an image of the image signal into a plurality of channels constituting a color space; and detecting edge components from respective images including the segmented channels.

The detecting of the edge component may include detecting the edge components of the image by comparing results of the detecting of the edge components from the respective images including the segmented channels.

According to still another aspect of the invention, there is provided a recording medium storing a program for executing the methods as described above.

BRIEF DESCRIPTION OF THE DRAWINGS

The above and other features and advantages of the invention will become more apparent by describing in detail exemplary embodiments thereof with reference to the attached drawings in which:

FIG. 7 is a diagram illustrating a method of controlling the digital photographing apparatus, according to another embodiment of the invention.

DETAILED DESCRIPTION

Figure 1:
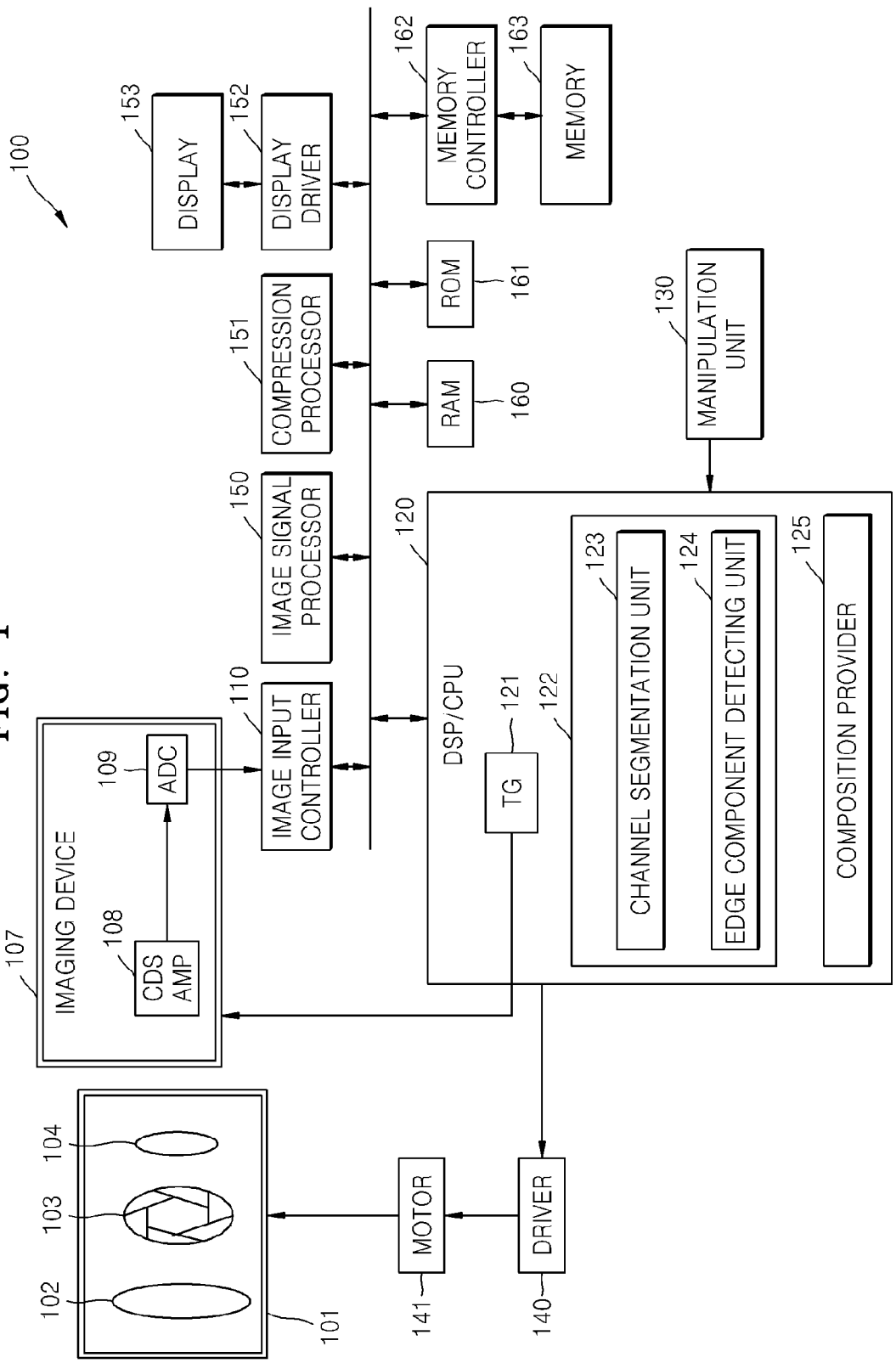
FIG. 1 is a block diagram illustrating a digital photographing apparatus according to an embodiment of the invention.

A digital photographing apparatus, a method of controlling the same, and a recording medium storing a program to execute the method will now be described more fully with reference to the accompanying drawings, in which exemplary embodiments of the invention are illustrated.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of units or functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more central processing units (CPUs) or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar references in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

The invention will now be described more fully with reference to the accompanying drawings, in which exemplary embodiments of the invention are shown.

FIG. 1 is a block diagram illustrating a digital photographing apparatus 100 according to an embodiment of the invention.

Referring to FIG. 1, the digital photographing apparatus 100 may include an optical imaging system 101, an imaging device 107, an image input controller 110, a digital signal processor (DSP)/central processing unit (CPU) 120, a manipulation unit 130, a driver 140, a motor 141, an image signal processor 150, a compression processor 151, a display driver 152, a display 153, a random-access memory (RAM) 160, a read-only memory (ROM) 161, a memory controller 162, and a memory 163.

For example, the optical imaging system 101 may include a lens group such as a zoom lens 102 and a focus lens 104, and an aperture 103. The optical imaging system 101, which is an optical system that images external optical information on the imaging device 107, may transmit an optical signal corresponding to the light from a subject to the imaging device 107. The zoom lens 102 may be a lens changing the angle of view according to the focus length. The aperture 103 may be an element adjusting the size of the optical signal. The focus lens 104 may move along the optical axis to focus a subject on a light receiving element of the imaging device 107. The zoom lens 102, the aperture 103, and the focus lens 104 may be driven by the motor 141. Although only one driver 140 and one motor 141 are shown in the digital photographing apparatus 100 of FIG. 1, the invention is not limited thereto. For example, the digital photographing apparatus 100 may include a pair of drivers and a pair of motors, respectively. The motor 141 may be driven by a driving signal from the driver 140.

The imaging device 107, which is an example of a photoelectric conversion device, may include a plurality of photoelectric conversion devices that convert the optical signal from the optical imaging system 101 into electrical signals. The respective photoelectric conversion devices may generate electrical signals in accordance with the received optical signal. Examples of the imaging device 107 may include a Charge-Coupled Device (CCD) sensor array, a Complementary Metal-Oxide Semiconductor (CMOS) sensor array, and the like.

In order to control the exposure time of the imaging device 107, a mechanical shutter (not shown) or an electronic shutter (not shown) may be used to shut out light in a non-photographing mode and allow light to pass in a photographing mode.

The imaging device 107 may include a correlated double sampling/amplifier (CDS/AMP) 108 and an analog-digital (A/D) converter 109. The CDS/AMP 108 may remove low frequency noise included in electrical signals outputted from the imaging device 107, and simultaneously amplifies the electrical signals. The A/D converter 109 may convert the electrical signals outputted from the CDS/AMP 108 into digital signals. The A/D converter 109 may output the digital signals to the image input controller 110.

The image input controller 110 may process the digital signals outputted from the A/D converter 109 to generate image signals that may be image-processed. The image input controller 110 may output the generated image signals to, for example, the image signal processor 150. The image input controller 110 may control the read or write of image data from/to the RAM 160.

The optical imaging system 101, the imaging device 107, and the image input controller 110 are examples of a photographing unit that may generate image signals by capturing an image of a subject.

The DSP/CPU 120 may serve as an operation processing unit and a control unit through programs, and may control processing of the respective components installed in the digital photographing apparatus 100. For example, the DSP/CPU 120 may drive the optical imaging system 101 by outputting signals to the driver 140 based on the focus control or exposure control. The DSP/CPU 120 may control the respective components of the digital photographing apparatus 100 based on the signals from the manipulation unit 130. The DSP/CPU 120 may include a timing generator TG 121 that may output timing signals to the CDS/AMP 108 and control the readout of charges and the exposure time of respective pixels constituting the imaging device 107.

Also, the digital photographing apparatus 100 may include an image analyzer 122 and a composition providing unit 125.

The image analyzer 122 may detect an edge component included in a photographed subject from an image signal generated by the photographing unit or an image signal of an image downsized in the image signal processor 150. The image analyzer 122 may include a channel segmentation unit 123 and an edge component detecting unit 124.

The channel segmentation unit 123 may segment the image of the image signal into a plurality of channel components constituting the color space. The color space is a spatial concept expressing the color system three-dimensionally. Examples of color spaces may include RGB, YCbCr, CMYK, HSV, and HSI color spaces. Each of the color spaces may define colors by specific channels. For example, the RGB color space expresses colors using three channels of red, green, and blue. The channel segmentation unit 123 may segment the image signal generated in the photographing unit into predetermined color space channels among various color space-expressing manners. That is, the channel segmentation unit 123 may segment one image signal into a plurality of images including one channel, respectively. For example, the channel segmentation unit 123 may segment a signal of a captured image into a Y-channel having a luminance component and Cb and Cr channels having a color difference component. Alternatively, the channel segmentation unit 123 may segment the image signal into channels included in two or more color spaces, for example, six channels complying with YCbCr and HSI color spaces. The segmentation of the image signal into a plurality of channels is merely an example, and therefore embodiments of the general inventive concept are not limited thereto. For example, only one channel, for example, a Y-channel having a luminance component may be segmented from the generated image signal.

On the other hand, the images segmented into the plurality of channels, respectively, may be simplified through binarization. The binarization may reduce loads that may be imposed on the processing of the image signal.

The edge component detecting unit 124 may detect edge components from segmented-channel images, respectively. For example, if an image signal is segmented into three channels of Y, Cb, and Cr, the edge component detecting unit 124 may detect edge components from a Y-channel image, a Cb-channel image, and a Cr channel image, respectively. However, when the edge components are detected from all channel images, loads may be considerably imposed on a system, causing the system to be slow or retarding the detection of linear components. Accordingly, the edge component may be detected from only one channel image according to the capability of the DSP/CPU 120. When the edge component is detected from only one channel image, the edge component may be detected from an image of a channel regarding the luminance component including the most image information, e.g., the Y-channel in the YCbCr mode or the I-channel in the HSI mode.

The edge component detecting unit 124 may use a Hough transform for detection of the edge components. The Hough transform is a representative method of detecting edge components from an image. When an equation representing an edge shape to be detected is applied to the Hough transform method, the edge components to be detected from the image may be detected. For example, a linear equation such as y=ax+b is applied to the Hough transform method, a linear component may be detected from the edge components included in the image. For another example, a parabolic equation such as y=ax2+bx+c is applied to the Hough transform algorithm, a ∪ or ∩-shaped edge component may be detected from the edge components included in the image. That is, the linear or parabolic components included in the image may be detected by applying the linear or parabolic equation to the Hough transform method.

On the other hand, when a linear component is detected from a captured image using the Hough transform, a plurality of linear components can be detected according to the image signal. In this case, the priorities of the plurality of the detected linear components may be assigned according to the intensity of the detected linear components. Accordingly, the edge component detecting unit 124 may extract only some linear components assigned with high priorities from the detected linear components to determine the extracted linear components as finally detected linear components. The number of the extracted linear components may be predetermined. Alternatively, when some linear components are extracted from the plurality of linear components, only the linear components having an intensity greater than a predetermined threshold value may be extracted. For example, if there is only one linear component that has an intensity greater than the threshold value among the linear components detected by the Hough transform, only the one linear component may be extracted as a final linear component even when three linear components are supposed to be extracted.

The process of detecting a plurality of linear components, assigning priories, and extracting only a portion of the plurality of detected linear components may also be similarly applied to the detecting of the parabolic components using the Hough transform.

On the other hand, when an image signal is segmented into a plurality of channels, and edge components are detected from the segmented-channel images, respectively, the edge component detecting unit 124 may finally detect the edge components of the image by comparing a plurality of edge component detection results. When the edge components are detected from the images segmented into the plurality of channels, the edge component detection results may not be identical to each other. That is, the edge component detection results may be different from each other according to the channels. For example, while two horizontal linear components are detected in an image including a Y-channel having a luminance component, only one horizontal linear component may be detected in images including Cb and Cr channels having a color difference component. In this case, only commonly-detected edge components may be determined as finally-detected edge components by comparing all the edge component detection results.

The composition providing unit 125 may provide a composition of an image using the edge components detected by the image analyzer 122. More specifically, when a plurality of linear components are detected in the image analyzer 122, the composition providing unit 125 may determine the image composition to be provided according to the slopes or the lengths of the plurality of detected linear components, or the mutual positions between the plurality of detected linear components. For example, when one linear component is detected, and the detected linear component is nearly horizontal, an image composition may be provided so as to be captured with an appropriate horizontal composition. For example, when a plurality of linear components are detected, and a combination of the detected linear components is close to a triangle, an image composition may be provided so as to be captured with an appropriate triangular composition. Here, the providing of the image composition may include providing guide lines according to the image composition as Graphic User Interfaces (GUIs) to the display 153 of the digital photographing apparatus 100. Accordingly, the composition providing unit 125 may provide a user with one composition from image composition data that is pre-stored.

When a plurality of edge components are detected by the image analyzer 122, the composition providing unit 125 may determine an image composition to be provided according to the shapes or mutual positions of the plurality of detected curved components.

While only one type component of linear component and parabolic component is detected by the image analyzer 122, the image analyzer 122 may detect the linear component as well as the parabolic component simultaneously. In this case, the composition providing unit 125 may provide an appropriate composition in consideration of all of the detected linear and parabolic components.

The manipulation unit 130 may be an element inputting various commands from a user for the control of the digital photographing apparatus 100. For example, the manipulation unit 130 may include a power button, a shutter button, and other functional buttons.

The RAM 160 may be an element storing various data temporarily. Although not shown, the RAM 160 may include a Video RAM (VRAM) as a memory for image display and a Synchronous DRAM (SDRAM) temporarily storing image data of a captured image.

The ROM 161 may store data set by a user regarding photographing conditions. The ROM 161 may store algorithms used for the DSP/CPU 120 to control the digital photographing apparatus 100. In the current embodiment, since the DSP/CPU 120 uses the Hough transform, methods for the Hough transform may be stored, and various linear equations and parabolic equations may be stored to be applied to the Hough transform method. Also, the ROM 161 may store various image composition data to be provided for a user. For example, the image composition data may be a GUI for providing a visual image composition for a user. Examples of the ROM 161 may include Electrically Erasable and Programmable Read Only Memories (EEPROMs).

The memory controller 162 may control the write of image data to the memory 163 and the read of the recorded image data or setting information from the memory 163. For example, the memory 163 may record data of captured images by using optical disks such as CDs, DVDs, and Blue-ray Disks (BDs), magneto-optical disks, magnetic disks, and semiconductor storage media. The image data may be an image file generated in the compression processor 151. The memory controller 162 and the memory 163 may be configured to be removable from the digital photographing apparatus 100.

The image signal processor 150 may receive image signals from the image input controller 110, and generate image signals that are image-processed based on a gain value for white balance control, aγ value, and a sharpness control value.

On the other hand, the image signal processor 150 may perform a signal processing such as downsizing, filtering, and binarization on image signals.

The image downsizing and filtering may be performed to remove details of the image. In case of the image downsizing, since the image signals generated by the photographing unit have large data sizes, it takes time to perform various signal processings or detect edges. Accordingly, since an edge component is detected from a downsized image, loads imposed on the system can be reduced, and operation speed can be increased. In case of a filter, the image signals of the original image or the downsized image may be applied to a Low Pass Filter (LPF). Points and lines included in the image can be removed by the image downsizing and the filtering described above, thereby facilitating the determination of the whole figure of the image.

The binarization may be performed to maximize simplification of the image.

The image downsizing, the filtering and the binarization may reduce the amount of operations necessary for signal processing, thereby reducing loads imposed on the system as well as enabling more exact detection of edges.

The compression processor 151 may receive image signals before compression processing, and may compress the image signals in a format such as Joint Photographic Experts Group JPEG, or Lempel-Ziv-Welch LZW. The compression processor 151 may send an image file including image data generated by the compression processing to, for example, the memory controller 162.

For example, the display driver 152 may receive the image data from the RAM 160, and display an image on the display 153. Examples of the images displayed on the display 153 may include images (live view images) read from the RAM 160 prior to photographing, various configuration screens of the digital photographing apparatus 100, and images recorded by photographing. Also, the display 153 may display edge components detected by the edge component detecting unit 124 and image composition data provided by the composition providing unit 125. The image composition data may include GUIs that can help a user to compose a photograph. The display 153 and the display driver 152 may include a Liquid Crystal Display (LCD) and an LCD driver, respectively, but the general inventive concept is not limited thereto. For example, the display 153 and the display driver 152 may include an Organic Luminescence Emitting Display (OLED) and an OLED driver By using the digital photographing apparatus 100 as described above, a user can photograph a subject with an appropriate composition according to images.

Hereinafter, exemplary embodiments of providing a composition of an image will be described in detail with reference to FIGS. 2A through 5C.

Figure 2A:
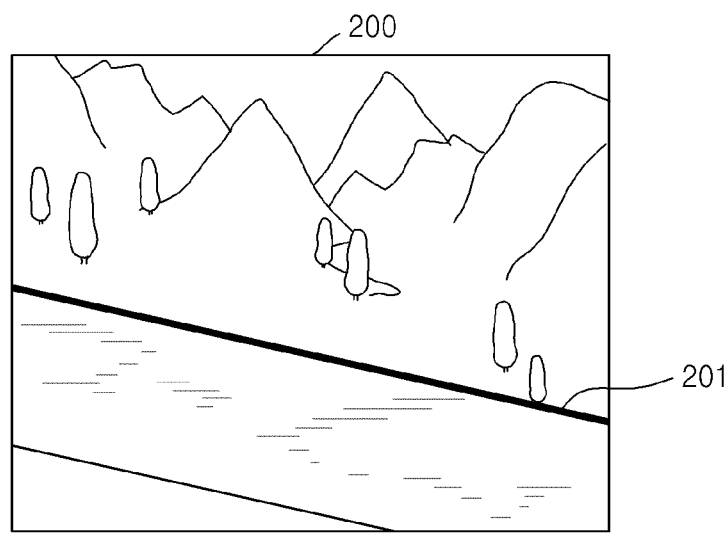
FIG. 2A illustrates an edge extracted from a captured image, according to an embodiment of the invention.
Figure 2B:
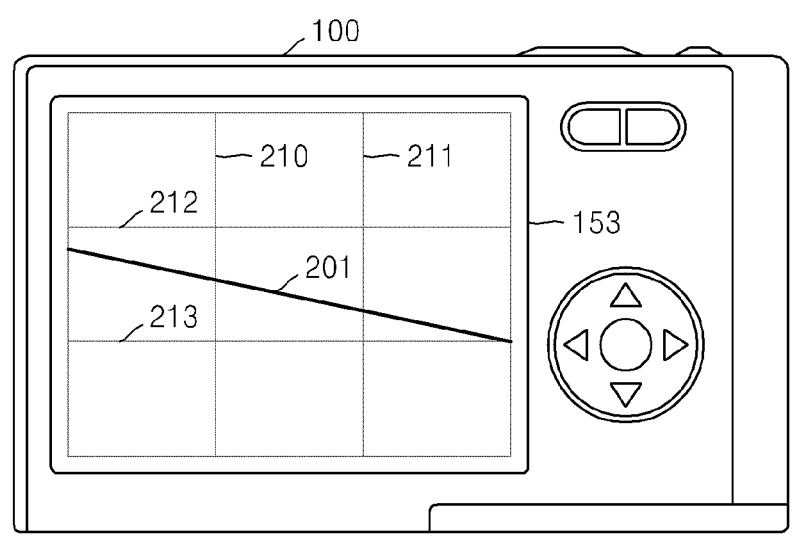
FIGS. 2B and 2C are diagrams illustrating a composition provided according to the extracted edge of FIG. 2A.
Figure 2C:
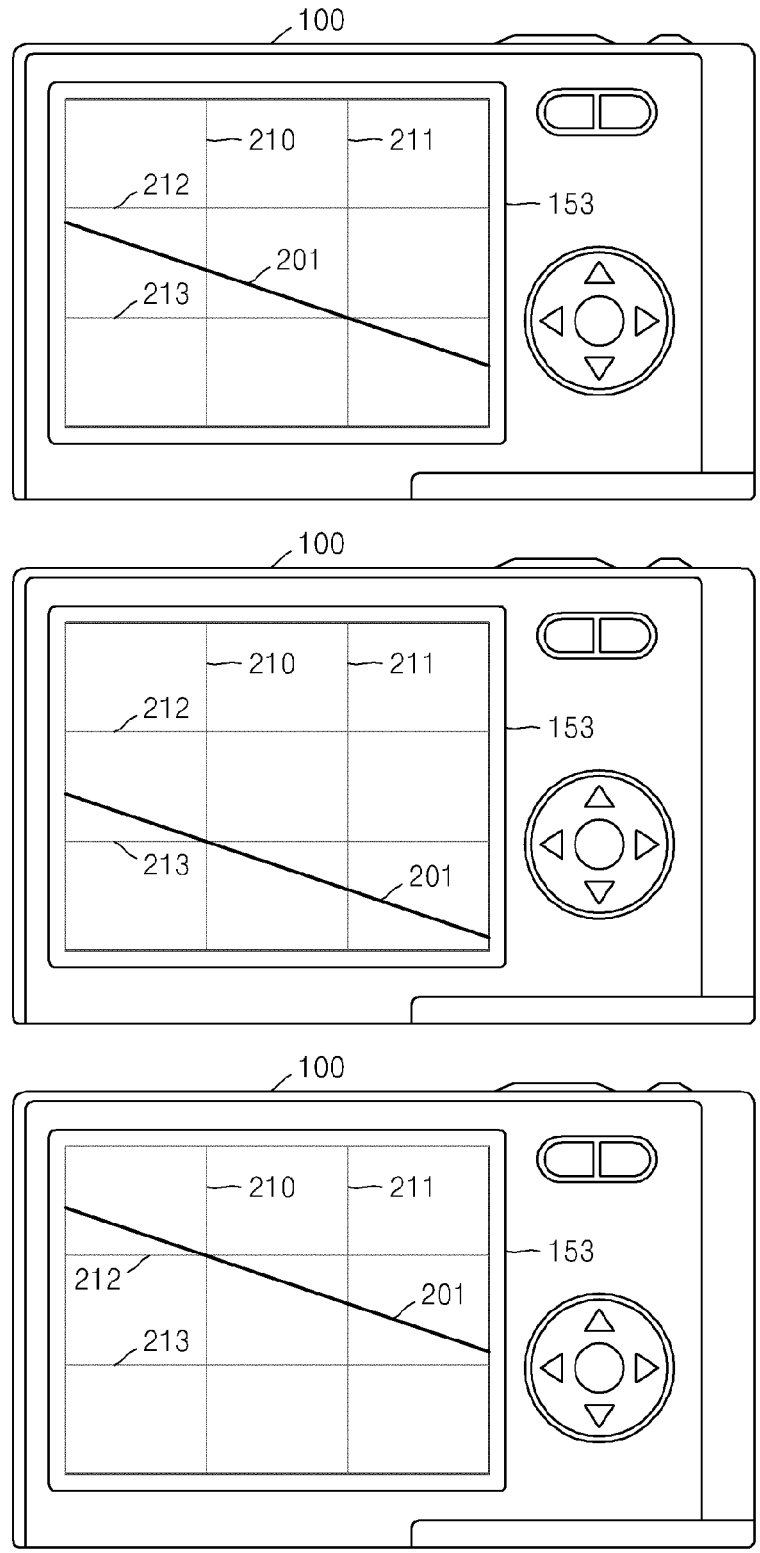

FIG. 2A illustrates an edge extracted from a captured image 200, according to an embodiment of the invention. FIGS. 2B and 2C are diagrams illustrating a composition provided according to the extracted edge of FIG. 2A.

The image 200 of FIG. 2A includes a river flowing in an oblique direction. The image analyzer 122 may perform the Hough transform on the image 200 of FIG. 2A to detect one linear component 201.

The detected linear component 201 may be close to an oblique line. Accordingly, when a linear component of an oblique direction is included, the composition providing unit 125 may provide a user with the most appropriate image composition, i.e., an oblique composition. FIG. 2B illustrates an example of the oblique composition provided to a user, which includes four guide lines 210 to 213. The four guide lines 210 to 213 may form a golden section. When the detected linear component 201 passes one of intersections of the guide lines 210 to 213, the image may be determined to be captured with an appropriate composition. Accordingly, when the detected linear component 201 does not pass the intersections of the guide lines 210 to 213, the linear component 201 may be indicated in a red color.

On the other hand, when the linear component 201 passes one of the intersections of the guide lines 210 to 213, as shown in FIG. 2C, the linear component 201 may be indicated in a green color.

Figure 3A:
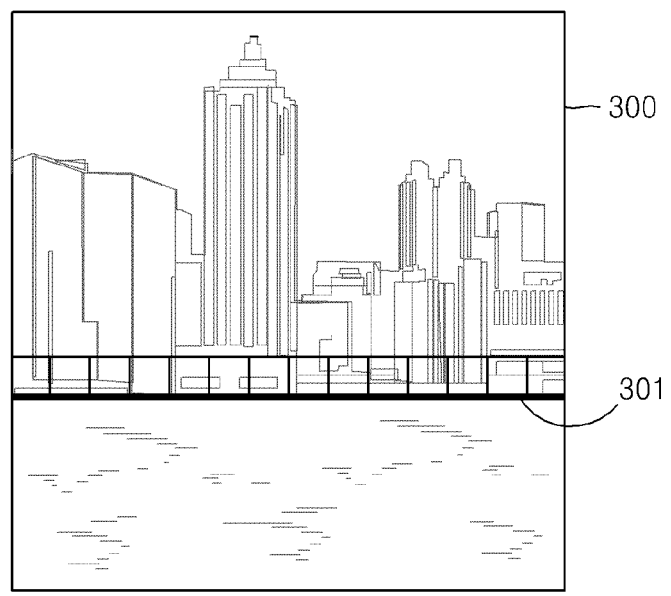
FIG. 3A illustrates an edge extracted from a captured image, according to another embodiment of the invention.

FIG. 3A illustrates an edge extracted from a captured image 300, according to another embodiment of the invention.

Figure 3B:
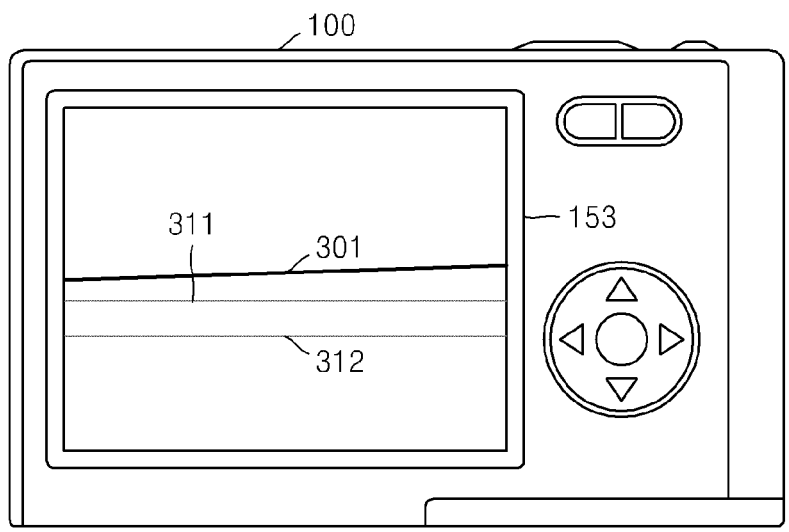
FIGS. 3B and 3C are diagrams illustrating a composition provided according to the extracted edge of FIG. 3A.
Figure 3C:
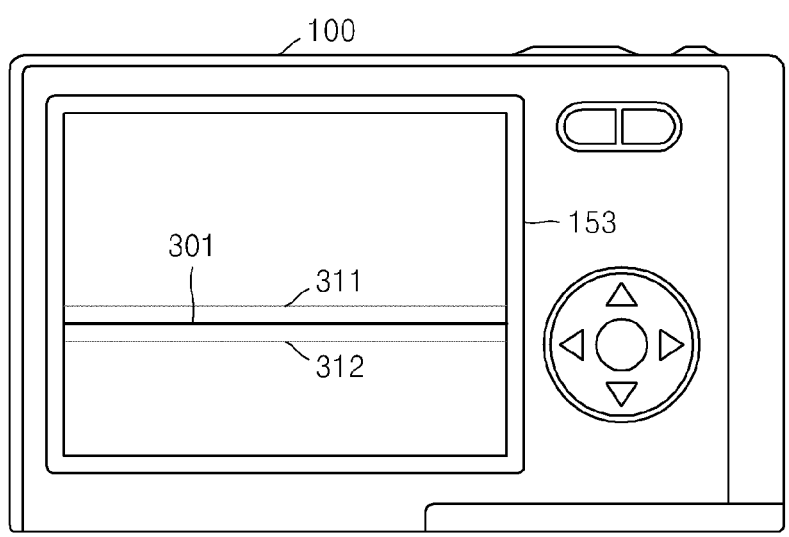

FIGS. 3B and 3C are diagrams illustrating a composition provided according to the extracted edge of FIG. 3A.

The image 300 of FIG. 3A includes a horizontal guardrail in the front of tall buildings. The image analyzer 122 may perform the Hough transform on the image 300 of FIG. 3A to detect one linear component 301.

The detected linear component 301 may be close to a horizontal line. Accordingly, when a horizontal linear component is included, the composition providing unit 125 may provide a user with the most appropriate image composition, i.e., a horizontal composition. FIG. 3B illustrates an example of the horizontal composition provided to a user, which may include two guide lines 311 and 312. In the case of the horizontal composition, when a horizontal linear component is adjacent to the lower one of the golden section lines, the image may provide a stable feeling to a viewer. The two guide lines 311 and 312 may include the lower one of the golden section lines. When the detected linear component 301 is positioned between the guide lines 311 and 312, the image may be determined to be captured with an appropriate composition. Accordingly, if the detected linear component 301 is not positioned between the guide lines 311 and 312, the linear component 301 may be indicated in a red color.

On the other hand, when the linear component 301 is positioned between the guide lines 311 and 312, as shown in FIG. 3C, the linear component 301 may be indicated in a green color.

Figure 4A:
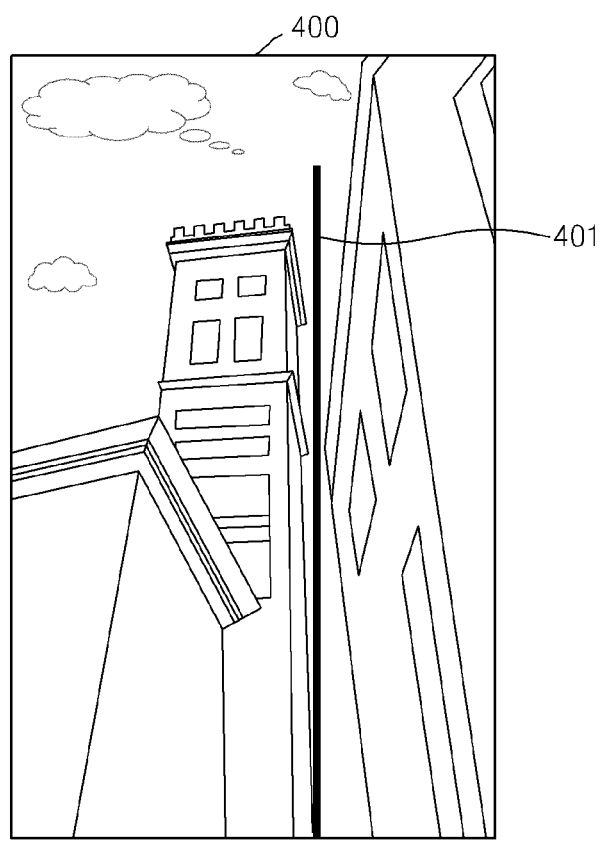
FIG. 4A illustrates an edge extracted from a captured image, according to another embodiment of the invention.

FIG. 4A illustrates an edge extracted from a captured image 400, according to another embodiment of the invention.

Figure 4B:
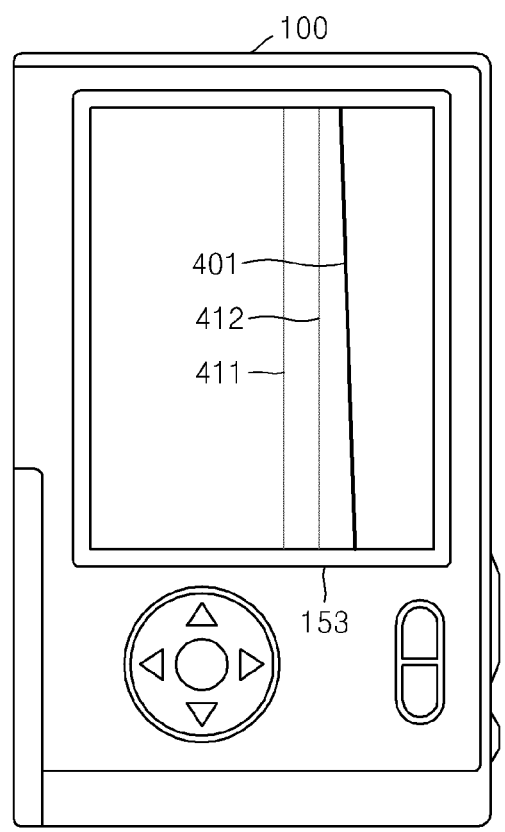
FIGS. 4B and 4C are diagrams illustrating a composition provided according to the extracted edge of FIG. 4A.
Figure 4C:
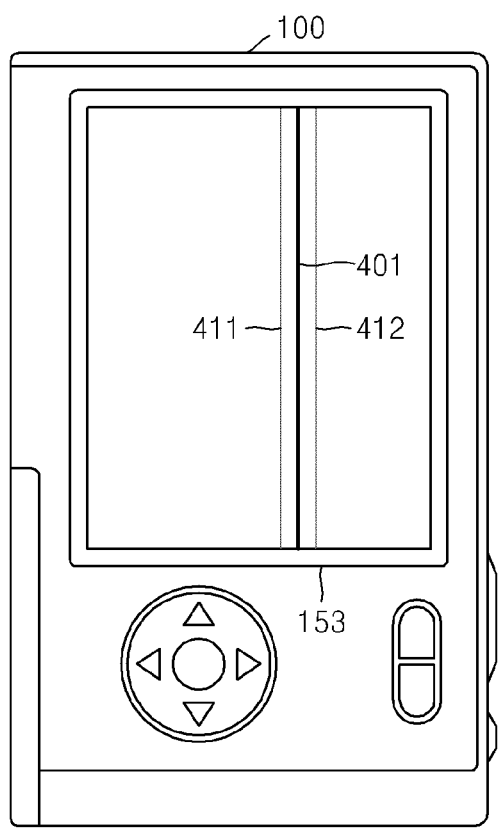

FIGS. 4B and 4C are diagrams illustrating a composition provided according to the extracted edge of FIG. 4A.

The image 400 of FIG. 4A includes tall buildings. The image analyzer 122 may perform the Hough transform on the image 400 of FIG. 4A to detect one linear component 401.

The detected linear component 401 may be close to a vertical line. Accordingly, when a vertical linear component is included, the composition providing unit 125 may provide a user with the most appropriate image composition, i.e., a vertical composition. FIG. 4B illustrates an example of the vertical composition provided to a user, which may include two guide lines 411 and 412. In the case of the vertical composition, when a vertical linear component is adjacent to the right or left vertical line of the golden section lines, the image may provide a stable feeling to a viewer. The two guide lines 411 and 412 may include the right vertical line of the golden section lines. When the detected linear component 401 is positioned between the guide lines 411 and 412, the image may be determined to be captured with an appropriate composition. Accordingly, if the detected linear component 401 is not positioned between the guide lines 411 and 412, the linear component 401 may be indicated in a red color.

On the other hand, when the linear component 401 is positioned between the guide lines 411 and 412, as shown in FIG. 4C, the linear component 301 may be indicated in a green color.

A guide line is generated at the right side of the image, in the current embodiment, but the general inventive concept is not limited thereto. For example, when the detected vertical component is positioned at the left side of the image, the guide lines may include the left vertical line of the golden section lines.

Figure 5A:
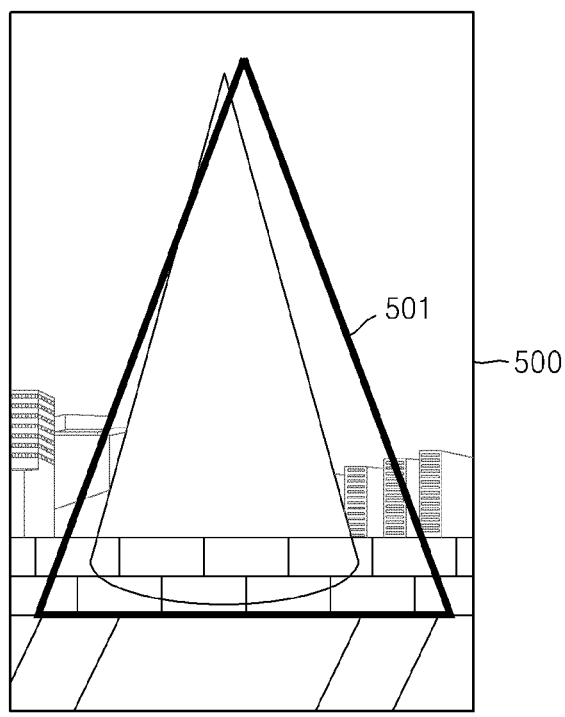
FIG. 5A illustrates an edge extracted from a captured image, according to another embodiment of the invention.

FIG. 5A illustrates an edge extracted from a captured image 500, according to another embodiment of the invention.

Figure 5B:
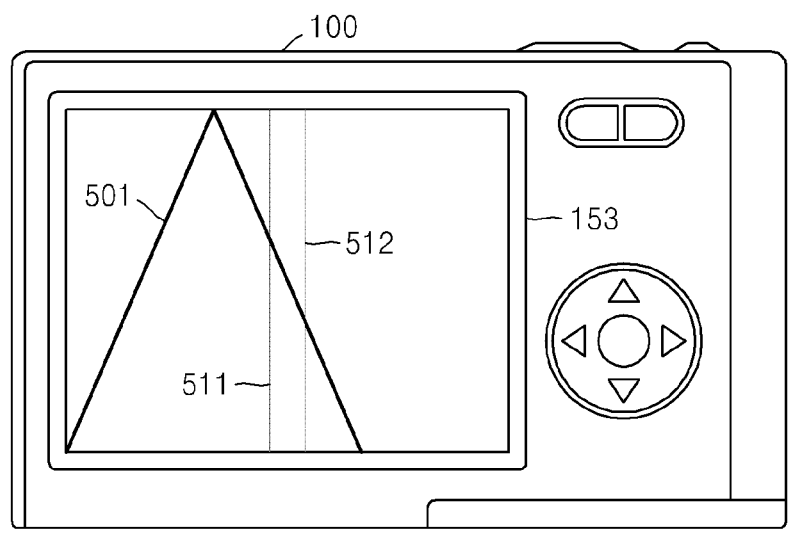
FIGS. 5B and 5C are diagrams illustrating a composition provided according to the extracted edge of FIG. 5A.
Figure 5C:
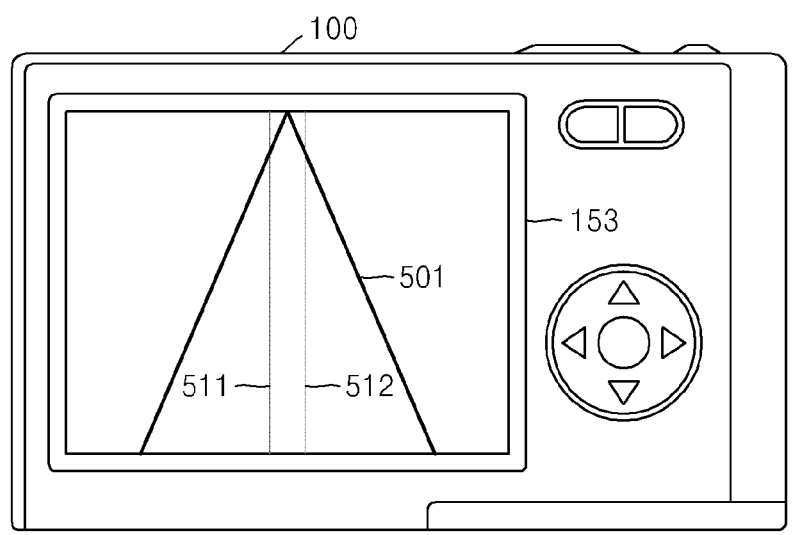

FIGS. 5B and 5C are diagrams illustrating a composition provided according to the extracted edge of FIG. 5A.

The image 500 of FIG. 5A includes a triangle-shaped building. The image analyzer 122 may perform the Hough transform on the image 500 of FIG. 5A to detect three linear components 501.

The detected linear components 501 may be close to a triangle. Accordingly, when triangular linear components are included, the composition providing unit 125 may provide a user with the most appropriate image composition, i.e., a triangular composition. FIG. 5B illustrates an example of the triangular composition provided to a user, which may include two guide lines 511 and 512. In the case of the triangular composition, when a triangular linear component is positioned at the center of the image, the image may provide a stable feeling to a viewer. The two guide lines 511 and 512 may be positioned at the center of the image. When the center of the detected linear components 501, i.e., the apex of the triangle is positioned between the guide lines 511 and 512, the image may be determined to be captured with an appropriate composition. Accordingly, if the center of the detected linear component 501 is not positioned between the guide lines 511 and 512, the linear component 501 may be indicated in a red color.

On the other hand, when the center of the linear component 501 is positioned between the guide lines 511 and 512, as shown in FIG. 5C, the linear component 501 may be indicated in a green color.

By providing image composition data for a user as described above, the user can photograph a subject according to images by using an appropriate composition.

Hereinafter, an operation of the digital photographing apparatus 100 according to the embodiment will be described in detail.

Figure 6:
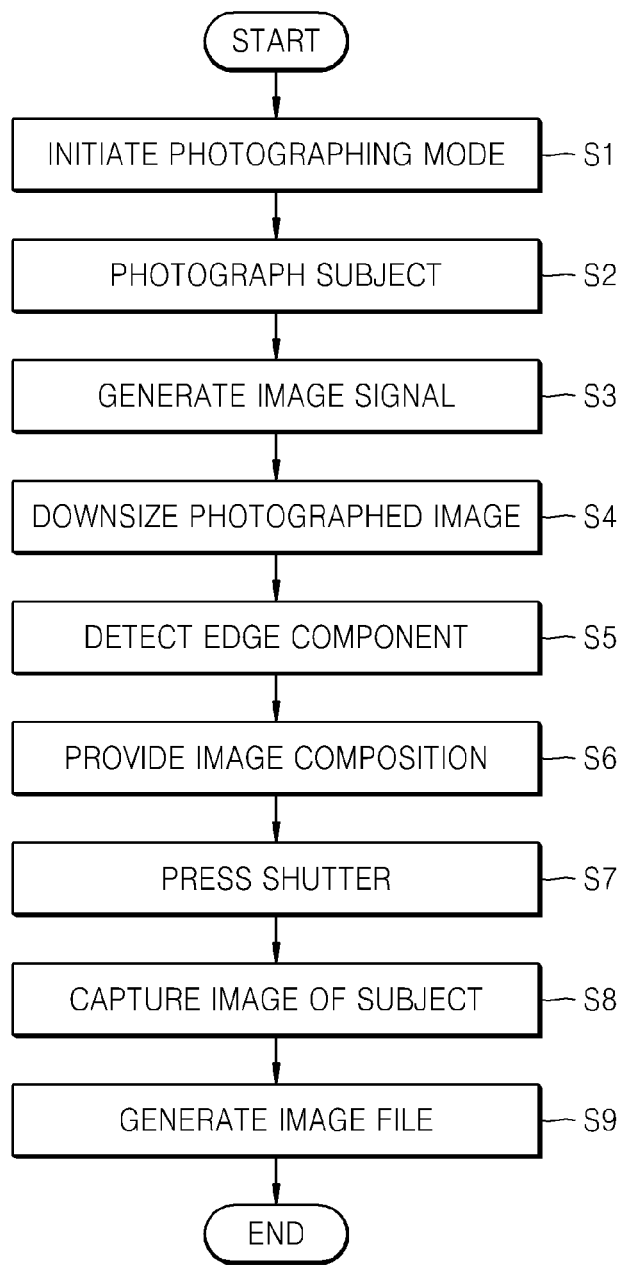
FIG. 6 is a flowchart illustrating a method of controlling the digital photographing apparatus, according to an embodiment of the invention.

FIG. 6 is a flowchart illustrating a method of controlling the digital photographing apparatus 100, according to an embodiment of the invention.

In operation S1, a user may turn on the digital photographing apparatus 100 to initiate a photographing mode. In operation S2, a photographing unit may photograph a subject when the photographing mode is initiated. In operation S3, an image signal may be generated using the image of the subject.

In operation S4, since the generated image signal having a large size imposes loads on a system, the image may be downsized. A filtering may also be performed using a LPF to remove unnecessary information, i.e., details of the image from the downsized image.

In operation S5, if the size of the image is downsized, edge components may be detected from the downsized image. The detection of the edge components may be performed using the Hough transform. The Hough transform may detect linear and parabolic components by applying various equations. When a plurality of linear components are detected by the Hough transform, the priorities of the Hough transforms may be assigned according to the intensity of the detected linear components. Accordingly, linear components having relatively higher priorities may be determined as finally-detected linear components among the detected linear components. In this case, the number of detected linear components may be predetermined.

In operation S6, when the detection of the edge components is completed, the detected edge components may be analyzed to provide an appropriate image composition. That is, when a plurality of linear components are detected through the detection of the edge components, the slopes, lengths, or mutual positions of the detected linear components may be determined to provide the image composition.

In operation S7, when a user moves the digital photographing apparatus 100 according to the provided image composition, and the image is displayed on the display 153 based on the provided image composition, a shutter input may be performed. In operation S8, the image of the subject may be captured by the shutter input. In operation S9, an image file may be generated through image signal processing and image compression.

FIG. 7 is a flowchart illustrating a method of controlling the digital photographing apparatus 100, according to another embodiment of the invention. Description of detection of linear components will be more fully provided below.

In operation S51, when the image is downsized, the downsized image may be segmented into a plurality of channels, which may constitute a color space. For example, the image may be segmented into a Y-channel having a luminance component, and Cb and Cr-channels having a color difference component. Alternatively, the image may be segmented into an H-channel having a hue component, an S-channel having a saturation component, and an I-channel having a brightness component. The channel segmentation may be performed by only one color space, or may be performed using channels belonging to two or more color spaces. Also, the channel segmentation may be performed using only a plurality of channels, but may also be performed, for example, using only the Y-channel having the luminance component.

In operation S52, if the image is segmented into a plurality of channels, edge components may be detected from each of the segmented channels. Each of the segmented channels may represent an image. For example, when the image is segmented into Y-channel, Cb-channel, and Cr-channel, edge components may be detected from each of the three images.

In operation S53, if the detection of the edge components is completed regarding the respective images from the segmented channels, the results of the detections of the edge components may be compared to each other to determine a final edge component of the image. When the detection of the edge components is performed on images segmented into a plurality of channels, the results of the detection may not be identical to each other. That is, the results of the detection of the edge components may be different from each other according to the channels. For example, two horizontal linear components may be detected from the image including the Y-channel having the luminance component, while only one horizontal linear component may be detected from images including Cb and Cr-channels having a color difference channel. In this case, only commonly-detected edge components may be determined as finally-detected edge components by comparing all the detected edge components.

As described above, a user may photograph a subject with an appropriate composition according to images by using the method of controlling the digital photographing apparatus 100.

By using the method of controlling the digital photographing apparatus 100, as described above, a user can photograph a subject with an appropriate composition according to images.

Programs to execute the control methods according to the embodiments and variations thereof may be stored in a recording medium. Here, the recording medium may be the memory 163, as shown in FIG. 1, or may be other recordable memories. Examples of recording media may include storage media such as magnetic storage media (e.g., ROMs, floppy disks, and hard disks) and optical recording media (e.g., CD-ROMs and Digital Versatile Discs (DVDs)). The recording medium may be non-transitory and may be restricted to physical medium.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
a photographing unit configured to generate an image signal by capturing an image of a subject;
an image analyzing unit configured to detect an edge component of the image from the image signal; and
a composition providing unit configured to provide an image composition guide according to the detected edge component;
wherein the image composition guide is displayed to assist in composition of the image;

wherein the composition providing unit is configured to display the detected edge component in a first color when the detected edge component is composed in relation to the provided image composition guide and to display the detected edge component in a second color when the detected edge component is not composed in relation to the provided image composition guide.

2. A digital photographing apparatus, comprising:
a photographing unit configured to generate an image signal by capturing an image of a subject;
an image analyzing unit configured to detect an edge component of the image from the image signal; and
a composition providing unit configured to provide an image composition guide according to the detected edge component;
wherein the provided image composition guide is displayed to assist in composition of the image;
wherein the provided image composition guide includes guiding lines for illustrating where a detected edge component should be placed in the image; and
wherein the composition providing unit is further configured to display the detected edge component in a first color when it is between the guiding lines and to display the detected edge component in a second color when it is not between the guiding lines.

3. The digital photographing apparatus of claim 1, wherein the image analyzing unit is configured to detect the edge component of the image by using a Hough transform.

4. The digital photographing apparatus of claim 3, wherein the image analyzing unit is configured to detect a linear component from the detected edge component of the image by using the Hough transform.

5. The digital photographing apparatus of claim 4, wherein the image analyzing unit is configured to extract a predetermined number of linear components having high priorities from the linear components detected by the Hough transform and assign priorities to the predetermined number of linear components.

6. The digital photographing apparatus of claim 5, wherein the composition providing unit is configured to provide the image composition according to slopes, lengths, or mutual positions of the extracted linear components.

7. The digital photographing apparatus of claim 3, wherein the image analyzing unit is configured to detect a parabolic component from the detected edge component of the image by using the Hough transform.

8. The digital photographing apparatus of claim 2, further comprising an image downsizing unit configured to downsize a size of the image, wherein the image analyzing unit is configured to detect the edge component by using an image signal of the downsized image.

9. The digital photographing apparatus of claim 1, wherein the image analyzing unit comprises:
a channel segmentation configured to segment the image of the image signal into a plurality of channels; and
an edge component detecting unit configured to detect edge components from the segmented plurality of channels.

10. The digital photographing apparatus of claim 9, wherein the image analyzing unit is configured to determine the edge components of the image by comparing detected edge components from the segmented plurality of channels.

11. A method of controlling a digital photographing apparatus, comprising:
generating an image signal by capturing an image of a subject;
detecting an edge component of the image from the image signal;
providing an image composition guide using the detected edge component; and
displaying the image composition guide to assist in composition of the image;
wherein the digital photographing apparatus displays the detected edge component in a first color when the detected edge component is composed in relation to the provided image composition guide and displays the detected edge component in a second color when the detected edge component is not composed in relation to the provided image composition guide.

12. The method of claim 11, wherein the detecting of the edge component comprises detecting a linear component from the detected edge component of the image by using a Hough transform.

13. The method of claim 12, wherein the detecting of the linear component comprises detecting linear components, assigning priorities to the detected linear components, and extracting a predetermined number of linear components having high priorities from the linear components assigned with the priorities.

14. The method of claim 13, wherein the providing of the image composition guide comprises providing the image composition guide according to slopes, lengths, or mutual positions of the extracted linear components.

15. The method of claim 11, wherein the detecting of the edge component comprises detecting a parabolic component from the detected edge component of the image by using the Hough transform.

16. The method of claim 11, further comprising downsizing a size of the image, wherein the detecting of the edge component comprises detecting the edge component by using an image signal of the downsized image.

17. The method of claim 11, wherein the detecting of the edge component comprises:
segmenting the image of the image signal into a plurality of channels constituting a color space; and
detecting edge components from the segmented plurality of channels.

18. The method of claim 17, wherein the detecting of the edge component comprises detecting the edge components of the image by comparing results of the detected edge components from the segmented plurality of channels.

19. A non-transitory computer program product, comprising a non-transitory computer usable medium having a computer readable program code embodied therein, said computer readable program code adapted to be executed to implement a method of controlling a digital photographing apparatus, said method comprising:
generating an image signal by capturing an image of a subject;
detecting an edge component of the image from the image signal;
providing an image composition guide using the detected edge component; and
displaying the image composition guide to assist in composition of the image;
wherein the digital photographing apparatus displays the detected edge component in a first color when the detected edge component is composed in relation to the provided image composition guide and displays the detected edge component in a second color when the detected edge component is not composed in relation to the provided image composition guide.

* * * * *